US011411962B2

(12) United States Patent
Kon

(10) Patent No.: US 11,411,962 B2
(45) Date of Patent: Aug. 9, 2022

(54) INFORMATION PROCESSING APPARATUS, ACCESS CONTROL METHOD, AND NON-TRANSITORY COMPUTER READABLE MEDIUM

(71) Applicant: NEC Corporation, Tokyo (JP)

(72) Inventor: Yoshinori Kon, Tokyo (JP)

(73) Assignee: NEC CORPORATION, Tokyo (JP)

( * ) Notice: Subject to any disclaimer, the term of this patent is extended or adjusted under 35 U.S.C. 154(b) by 25 days.

(21) Appl. No.: 17/037,030

(22) Filed: Sep. 29, 2020

(65) Prior Publication Data

US 2021/0126921 A1 Apr. 29, 2021

(30) Foreign Application Priority Data

Oct. 23, 2019 (JP) .............................. JP2019-192590

(51) Int. Cl.
*H04L 9/40* (2022.01)
*G08B 21/22* (2006.01)
*G06V 20/52* (2022.01)

(52) U.S. Cl.
CPC ............ *H04L 63/107* (2013.01); *G06V 20/52* (2022.01); *G08B 21/22* (2013.01); *H04L 63/08* (2013.01); *H04L 63/105* (2013.01)

(58) Field of Classification Search
CPC ..... H04L 63/107; H04L 63/08; H04L 63/105; H04L 63/0846; H04L 63/0861; G06K 9/00771; G06K 9/00288; G08B 21/22; G06V 20/52; G06V 40/172
USPC ........................................................ 726/27
See application file for complete search history.

(56) References Cited

U.S. PATENT DOCUMENTS

| | | | | |
|---|---|---|---|---|
| 6,363,140 B1* | 3/2002 | Pinard | ..................... | H04L 51/12 |
| | | | | 379/88.22 |
| 10,692,319 B2* | 6/2020 | Ichikawa | ................ | G08B 25/04 |
| 2003/0039380 A1* | 2/2003 | Sukegawa | .......... | G06K 9/00288 |
| | | | | 382/118 |
| 2007/0050634 A1* | 3/2007 | Makimoto | ............ | H04L 9/3263 |
| | | | | 713/182 |
| 2010/0245033 A1* | 9/2010 | Sasakuma | ................ | G07C 9/27 |
| | | | | 340/5.2 |
| 2011/0157366 A1* | 6/2011 | Padmanabh | ......... | G08B 13/196 |
| | | | | 348/159 |

(Continued)

FOREIGN PATENT DOCUMENTS

JP 2007-011795 A 1/2007

*Primary Examiner* — Kambiz Zand
*Assistant Examiner* — Aubrey H Wyszynski
(74) *Attorney, Agent, or Firm* — Sughrue Mion, PLLC

(57) ABSTRACT

A flexible access control for a plurality of terminal apparatuses in a physically-secured area is realized. An information processing apparatus includes a first acquisition unit configured to acquire a result of authentication performed when a specific user enters a target work room, a second acquisition unit configured to acquire a monitoring result obtained by periodically monitoring a staying state of the specific user in a work area including a target work terminal in the target work room, and an access control unit configured to permit access to the target work terminal when a first condition is satisfied, the first condition being a condition that the monitoring result indicates that the specific user stays in the work area after he/she is permitted to enter the target work room based on the authentication result.

10 Claims, 10 Drawing Sheets

(56) References Cited

U.S. PATENT DOCUMENTS

| | | | |
|---|---|---|---|
| 2013/0201338 A1* | 8/2013 | Westmacott | H04N 7/188 348/159 |
| 2014/0163977 A1* | 6/2014 | Hoffmeister | G10L 15/32 704/232 |
| 2019/0236376 A1* | 8/2019 | Sakashita | G07C 9/27 |
| 2020/0302714 A1* | 9/2020 | Matsui | G07C 9/247 |
| 2020/0401683 A1* | 12/2020 | Izumi | H04N 1/4433 |

* cited by examiner

INFORMATION PROCESSING APPARATUS, ACCESS CONTROL METHOD, AND NON-TRANSITORY COMPUTER READABLE MEDIUM

INCORPORATION BY REFERENCE

This application is based upon and claims the benefit of priority from Japanese patent application No. 2019-192590, filed on Oct. 23, 2019, the disclosure of which is incorporated herein in its entirety by reference.

TECHNICAL FIELD

The present disclosure relates to an information processing apparatus, an access control method, and an access control program, and in particular to an information processing apparatus, an access control method, and an access control program for controlling access to a terminal apparatus in a physically-secured area.

BACKGROUND ART

Japanese Unexamined Patent Application Publication No. 2007-011795 discloses a technique relating to a user authentication system. The system disclosed in Japanese Unexamined Patent Application Publication No. 2007-011795 holds, in advance, a use pattern in which an order of use of an IC card when it is used in a plurality of apparatuses is defined. Further, when the user has the IC card authenticated by a certain authentication apparatus, the authentication apparatus acquires a history of use of the IC card in the plurality of apparatuses by the user and determines whether or not the history of use is appropriate based on the use pattern. Then, when the authentication apparatus determines that the history of use is appropriate, it authenticates the user based on the IC card.

Note that in Japanese Unexamined Patent Application Publication No. 2007-011795, it is assumed that a plurality of authentication apparatuses for authenticating IC cards as well as physical security measures are installed or provided at a plurality of places where the user passes through. However, even in a room with high physical security (such as a server room), there are a plurality of server apparatuses or the like belonging to different projects. Therefore, it is necessary to manage a security level for each user in an elaborated manner. Further, from the viewpoint of time and cost, it is not realistic to change the arrangement of physical security measures every time the security level or the user to be authenticated is changed. Therefore, in Japanese Unexamined Patent Application Publication No. 2007-011795, there is a problem that it is difficult to flexibly cope with a change in the use pattern.

SUMMARY

The present disclosure has been made to cope with such a problem and an object thereof is to provide an information processing apparatus, an access control method, and an access control program for realizing flexible access control for a plurality of terminal apparatuses in a physically-secured area.

In a first example aspect, an information processing apparatus includes:

a first acquisition unit configured to acquire a result of authentication performed when a specific user enters a target work room;

a second acquisition unit configured to acquire a monitoring result obtained by periodically monitoring a staying state of the specific user in a work area including a target work terminal in the target work room; and an access control unit configured to permit access to the target work terminal when a first condition is satisfied, the first condition being a condition that the monitoring result indicates that the specific user stays in the work area after he/she is permitted to enter the target work room based on the authentication result.

In a second example aspect, an access control method includes:

acquiring, by a computer, a result of authentication performed when a specific user enters a target work room;

acquiring, by the computer, a monitoring result obtained by periodically monitoring a staying state of the specific user in a work area including a target work terminal in the target work room; and permitting, by the computer, access to the target work terminal when a first condition is satisfied, the first condition being a condition that the monitoring result indicates that the specific user stays in the work area after he/she is permitted to enter the target work room based on the authentication result.

In a third example aspect, an access control program causes a computer to perform:

a first acquisition process of acquiring a result of authentication performed when a specific user enters a target work room;

a second acquisition process of acquiring a monitoring result obtained by periodically monitoring a staying state of the specific user in a work area including a target work terminal in the target work room; and an access control process of permitting access to the target work terminal when a first condition is satisfied, the first condition being a condition that the monitoring result indicates that the specific user stays in the work area after he/she is permitted to enter the target work room based on the authentication result.

BRIEF DESCRIPTION OF DRAWINGS

The above and other aspects, features and advantages of the present disclosure will become more apparent from the following description of certain example embodiments when taken in conjunction with the accompanying drawings, in which.

EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

First Example Embodiment

Figure 1:
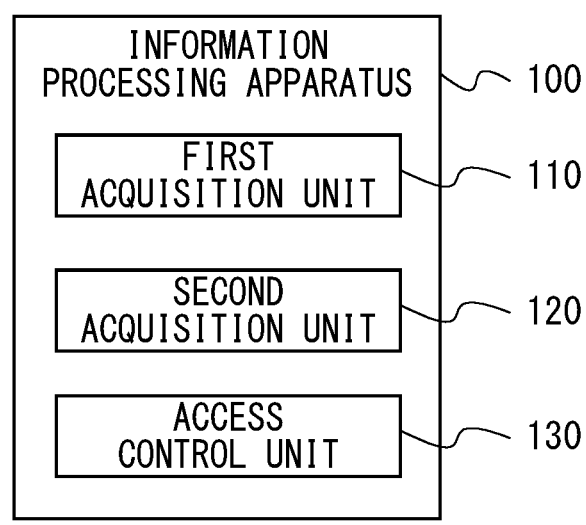
FIG. 1 is a block diagram showing a configuration of an information processing apparatus according to a first example embodiment.

FIG. 1 is a block diagram showing a configuration of an information processing apparatus 100 according to a first example embodiment. The information processing apparatus 100 is a computer system that performs, for each user, access control to a plurality of target work terminals installed in a target work room. Note that it is assumed that physical security such as a security gate is provided at the entrance of the target work room. That is, a user needs to be authenticated through authentication using an IC card, face authentication, biometric authentication, or the like in order to enter the target work room. Further, it is also assumed that a work area is set (or defined) for each target work terminal in the target work room. Further, it is assumed that the work areas are set (i.e., defined) on the system and they are equipped with no physical security, so that a user can physically move between these work areas. Therefore, it is assumed that a monitoring apparatus is installed in the target work room according to this example embodiment and it periodically monitors an area where the user, who has entered into the room, stays. Further, it is assumed that in order to enable the user to enter the target work room and do work at a predetermined target work terminal (i.e., perform an operation to access a terminal), a request (or an application) as to his/her user information (a facial image or the like), a target work terminal, a working time zone, and the like has been made to the system in advance.

The information processing apparatus 100 includes a first acquisition unit 110, a second acquisition unit 120, and an access control unit 130. The first acquisition unit 110 acquires a result of authentication that was performed when a specific user entered the target work room. Note that it is assumed that the authentication result is acquired from a predetermined authentication apparatus installed near the entrance of the target work room. Further, it is assumed that the authentication result is information indicating at least whether or not the specific user who intends to enter the target work room was authenticated and permitted to enter the target work room. Further, the authentication result may include a time when the specific user was permitted to enter the room (an authentication permission time).

The second acquisition unit 120 acquires a monitoring result obtained by periodically monitoring a staying state of the specific user in the work area including the target work terminal in the target work room. Note that it is assumed that the monitoring result is acquired from a monitoring apparatus installed in the target work room. Further, it is assumed the monitoring result is information indicating whether or not the specific user stays in the work area. Alternatively, the monitoring result may be information indicating that the specific user stays outside a prohibited area. Further, the monitoring result may include a monitoring time (a time of the stay).

The access control unit 130 permits the specific user to access the target work terminal when he/she satisfies a first condition. Note that the first condition is a condition that the monitoring result indicates that the specific user stays in the work area after he/she is permitted to enter the target work room based on the authentication result. Further, the "access to the target work terminal" means, for example, the whole types of operations to access the target work terminal through an input/output device.

Figure 2:
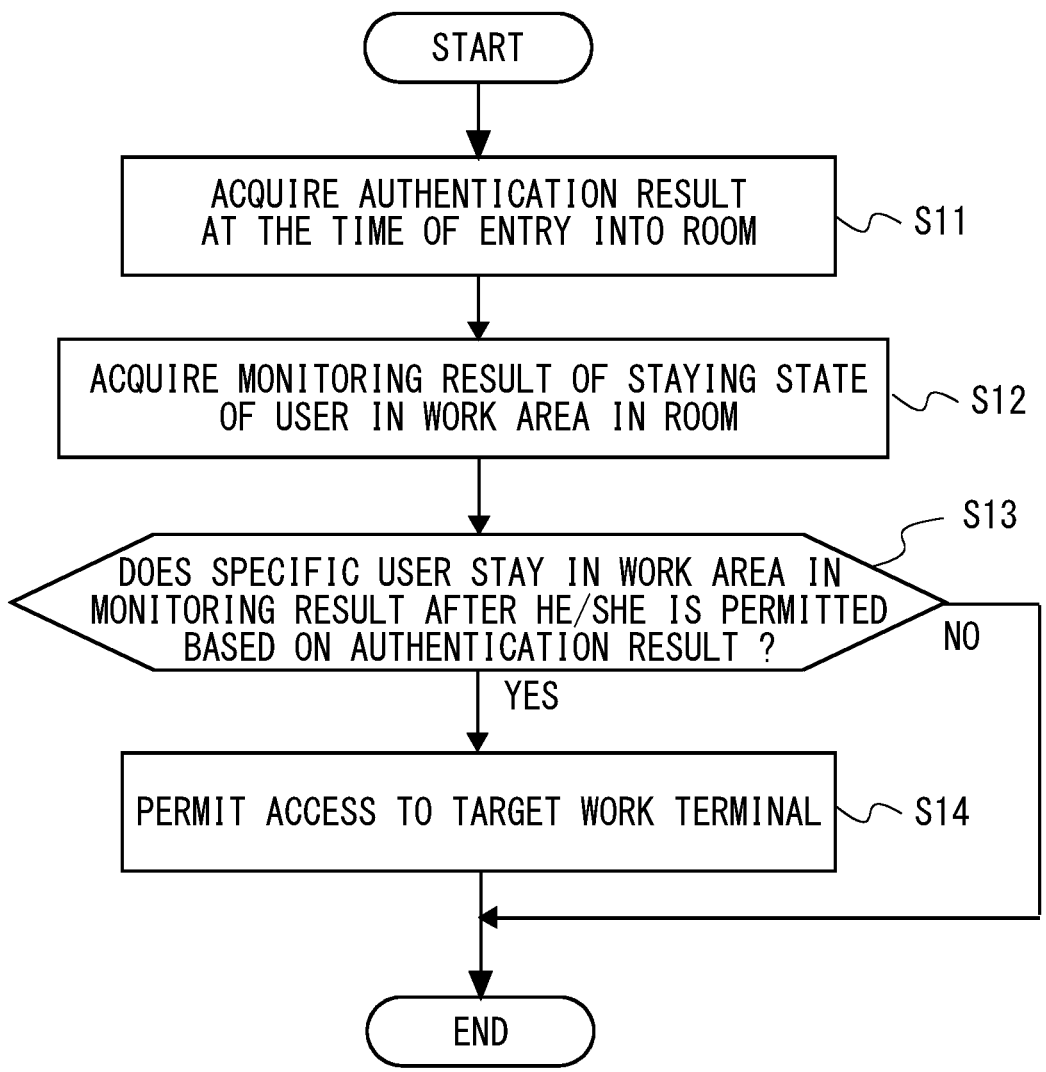
FIG. 2 is a flowchart showing a flow of an access control method according to the first example embodiment.

FIG. 2 is a flowchart showing a flow of an access control method according to the first example embodiment. Firstly, the first acquisition unit 110 acquires a result of authentication that is performed when a specific user enters the target work room (S11). Next, the second acquisition unit 120 acquires a monitoring result acquired by periodically monitoring a staying state of the specific user in a work area including a target work terminal in the target work room (S12). Then, the access control unit 130 determines whether or not a first condition that the monitoring result indicates that the specific user stays in the work area after he/she is permitted to enter the target work room based on the authentication result is satisfied (S13). When the access control unit 130 determines that the first condition is satisfied, it permits the specific user to access the target work terminal (S14).

As described above, in this example embodiment, it is assumed that a specific user has already passed through physical security when he/she operates a target work terminal for which he/she has already made a request for the use. However, a plurality of terminal apparatuses are installed in a target work room to which physical security is provided, and in many cases, physical security is not provided on a terminal-by-terminal basis. Therefore, there is a risk that if a user can pass through the physical security in some way, a terminal apparatus for which no request has been made may be accessed by the user. Although this risk can be reduced by installing a number of physical security measures. However, it is not realistic to change the physical security, for example, every time terminal apparatuses are rearranged or users are changed because such changes require the time and the cost.

Therefore, in this example embodiment, a user staying in a specific work area in the room is identified from photographed images (or filmed images) that are periodically taken (e.g., photographed or filmed) by a monitoring apparatus, such as a camera, installed in the target work room to which the physical security is provided. Further, the identified user is permitted to access the target work terminal on the condition that he/she has already been authenticated by the physical security and stays, after the authentication, in the work area for which he/she has already requested the use. It should be noted that since the work area is a logically defined and independent of the physical security, the administrator of the system can freely and easily change the setting according to the operation of the system. Therefore, it is possible to realize flexible access control for a plurality of terminal apparatuses in the physically-secured area.

Note that the information processing apparatus 100 includes a processor, a memory, and a storage device (not shown). Further, a computer program including instructions or the like for performing the processes of the access control method according to this example embodiment is stored in the storage device. Further, the processor loads the computer program from the storage device into the memory and executes the loaded computer program. In this way, the processor implements the functions of the first acquisition unit 110, the second acquisition unit 120, and the access control unit 130.

Alternatively, each of the first acquisition unit 110, the second acquisition unit 120 and the access control unit 130 may be implemented by dedicated hardware. Further, some or all of the components of each unit may be implemented by a general-purpose or special-purpose circuit (circuitry), a processor or the like, or a combination thereof. They may be formed by a single chip, or may be formed by a plurality of chips connected to each other through a bus. Some or all of the components of each unit may be implemented by a combination of the above-described circuit or the like and a program. Further, as the processor, a CPU (Central Processing Unit), a GPU (Graphics Processing Unit), an FPGA (field-programmable gate array), or the like may be used.

Further, when some or all of the components of the information processing apparatus 100 are implemented by a plurality of information processing apparatuses, circuits, or the like, the plurality of information processing apparatuses, the circuits, or the like may be disposed in one place or arranged in a distributed manner. For example, the information processing apparatuses, the circuits, and the like may be implemented as a client-server system, a cloud computing system or the like, or a configuration in which the apparatuses or the like are connected to each other through a communication network. Alternatively, the functions of the information processing apparatus 100 may be provided in the form of SaaS (Software as a Service).

Second Example Embodiment

Figure 3:
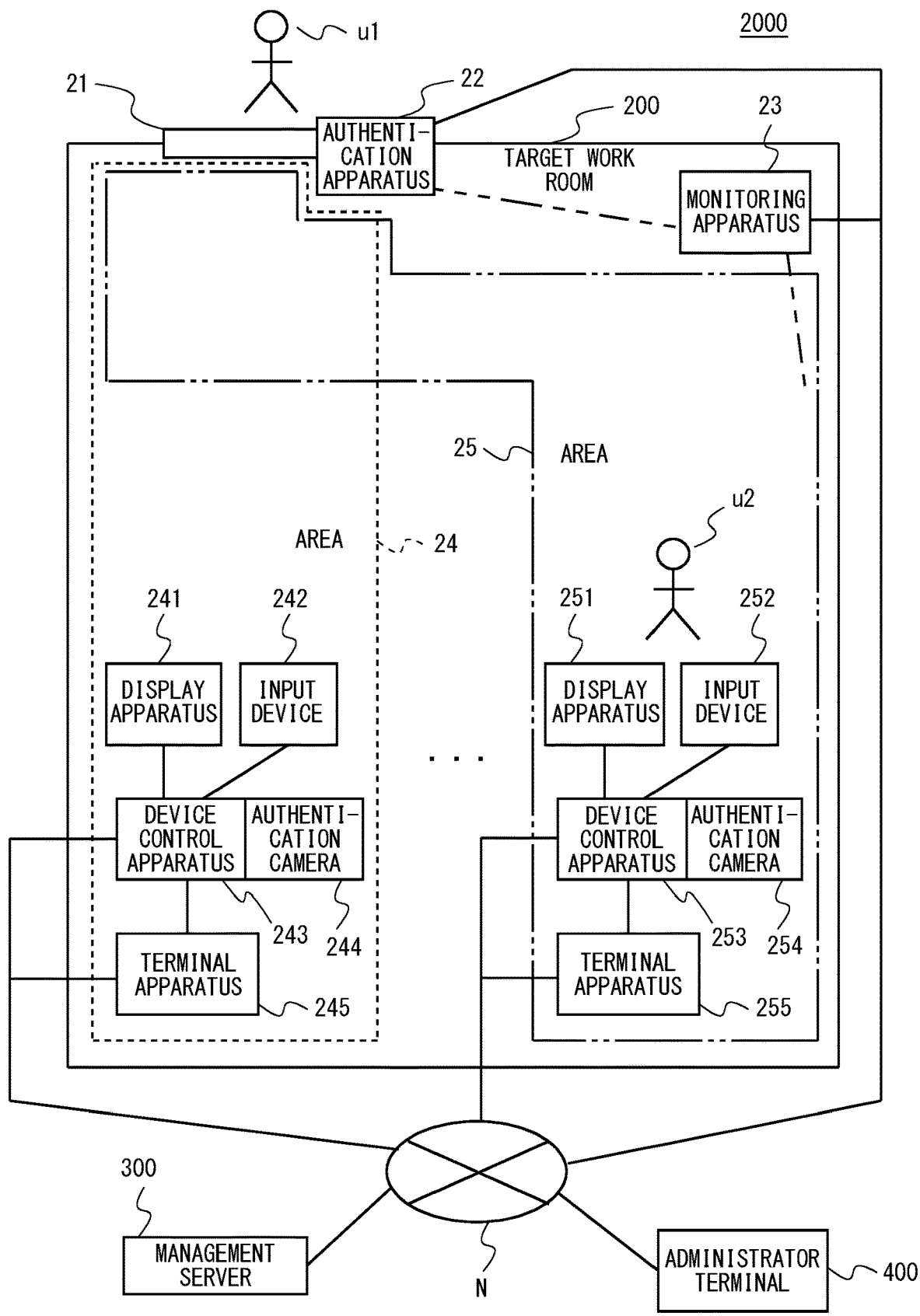
FIG. 3 is a block diagram showing an overall configuration of an access control system according to a second example embodiment.

A second example embodiment is a specific example of the above-described first example embodiment. FIG. 3 is a block diagram showing an overall configuration of an access control system 2000 according to the second example embodiment. The access control system 2000 includes a target work room 200 in which a plurality of terminal apparatuses are installed, a management server 300, and an administrator terminal 400. The target work room 200 includes a security gate 21, an authentication apparatus 22, and a monitoring apparatus 23. Further, areas 24 and 25 and the like are set (or defined) in the target work room 200. Note that it is assumed that the areas 24 and 25 and the like are areas set (i.e., defined) on the system and they are equipped with no physical security, so that a user can physically move between these areas.

The security gate 21 is an example of the physical security and operates in conjunction with the authentication apparatus 22. The authentication apparatus 22 authenticates a user u1. The authentication apparatus 22 determines whether or not the user u1 satisfies request information requested in advance, and notifies the security gate 21 of a result of the determination (a recognition result). The authentication apparatus 22 permits the user u1 to enter the target work room 200 when the condition is satisfied, and does not permit him/her to enter the room when the condition is not satisfied. Therefore, the security gate 21 opens when the user u1 is permitted by the authentication apparatus 22, and remains closed (or issue an alert) when he/she is not permitted by the authentication apparatus 22. Note that the physical security is not limited to the security gate 21, and may be any measure that can physically restrict the entry of the user u1 into the room. Further, the authentication apparatus 22 may be, for example, an IC card reader or a camera. In the case of the IC card reader, the authentication apparatus 22 compares a user ID requested (e.g., submitted) in advance with a user ID read from an IC card held over the reader by the user u1. Then, when they match each other, the authentication apparatus 22 permits the user u1 to enter the room. Further, in the case of the camera, the authentication apparatus 22 permits the user u1 to enter the room when the degree of matching (i.e., the degree of similarity) between a facial image of the user requested in advance and a photographed image (or a filmed image) of the user u1 taken (e.g., photographed or filmed) by the camera satisfies a predetermined condition. Further, the authentication apparatus 22 transmits a result of the authentication to the management server 300 through a network N. Alternatively, the authentication apparatus 22 transmits the authentication result to the management server 300 in response to a request from the management server 300.

The monitoring apparatus 23 is, for example, a monitoring camera. The monitoring apparatus 23 shoots (e.g., photographs or films) at least the areas 24 and 25 in the target work room 200 and periodically transmits the photographed images (or filmed images) to the management server 300 through the network N.

The area 24 is a work area in which a specific user who has made a request in advance is permitted to stay in order to operate a terminal apparatus 245. In the area 24, a display apparatus 241, an input device 242, a device control apparatus 243, an authentication camera 244, and the terminal apparatus 245 are installed or provided. The terminal apparatus 245 is a computer apparatus which is connected to the network N and through which the user operates a predetermined information system (not shown). Note that the terminal apparatus 245 outputs a record relating to connections of devices and the like to a system log (the so-called syslog). For example, when the terminal apparatus 245 detects the connection of a new device, it outputs information about the device to the system log.

The display apparatus 241 and the input device 242 are examples of input/output devices connected to the terminal apparatus 245 through the device control apparatus 243. The display apparatus 241 is, for example, a display apparatus. Further, the input device 242 is, for example, a keyboard and/or a mouse.

The device control apparatus 243 is connected to the display apparatus 241, the input device 242, and the terminal apparatus 245, and permits access based on the user ID that has been requested (e.g., submitted) in advance. For example, when access is permitted, the device control apparatus 243 outputs a signal sent from the input device 242 to the terminal apparatus 245, and outputs a signal sent from the terminal apparatus 245 to the display apparatus 241. The device control apparatus 243 is also connected to the network N, and acquires access control information such as the user ID requested in advance from the management server 300 through the network N and holds the acquired information in the device control apparatus 243 itself. Further, the device control apparatus 243 controls access between the display apparatus 241 and the terminal apparatus 245, and between the input device 242 and the terminal apparatus 245 according to the access control information. The access control information includes, for example, information about a right to input, a right to display (browse), and the like for each user ID. Further, the device control apparatus 243 controls access between the display apparatus 241 and the terminal apparatus 245, and between the input device 242 and the terminal apparatus 245 according to an access control instruction sent from the management server 300.

The authentication camera 244 is connected to the device control apparatus 243, shoots (e.g., photographs or films) the surroundings of the display apparatus 241, the input device 242, and the device control apparatus 243, and outputs the photographed image (or filmed images) to the device control apparatus 243. In this case, the device control apparatus 243 transmits the photographed images (or filmed images) obtained by the authentication camera 244 to the management server 300 through the network N. Note that the device control apparatus 243 transmits, at least when access is made (i.e., attempted) from the display apparatus 251 or the input device 252, the photographed images (or filmed images) to the management server 300 through the network N.

The area 25 is a work area in which a specific user who has made a request in advance is permitted to stay in order to operate a terminal apparatus 255. In the area 25, a display apparatus 251, an input device 252, a device control apparatus 253, an authentication camera 254, and a terminal apparatus 255 are installed or provided. Note that each of the components installed or provided in the area 25 has the same function as that of the corresponding component installed or provided in the area 24, and therefore the redundant description thereof is omitted. However, the terminal apparatus 255 is a computer apparatus through which the user operates, through the network N, an information system (not shown) different from that operated through the terminal apparatus 245.

In the example shown in FIG. 3, a user u2 stays in front of the display apparatus 251 and the input device 252 (in a place where the user can operate these devices) in the area 25. Therefore, a photographed image (or a filmed image) obtained by the authentication camera 254 includes the user u2.

The administrator terminal 400 is a computer apparatus that is connected to the network N and operated by an administrator of the access control system 2000. The administrator terminal 400 transmits (registers) request information input by the administrator to the management server 300 through the network N. Note that the request information is information by which a specific user requests to enable him/her to operate a specific terminal apparatus in the target work room 200 in a working time zone. Note that the administrator terminal 400 can also change area information 315 stored in the management server 300 as appropriate (which will be described later). Therefore, the administrator can easily change the request information and the area information according to the operation of the system, so that he/she can carry out, for each user, flexibly control access to a plurality of terminal apparatus in the target work room 200.

Figure 4:
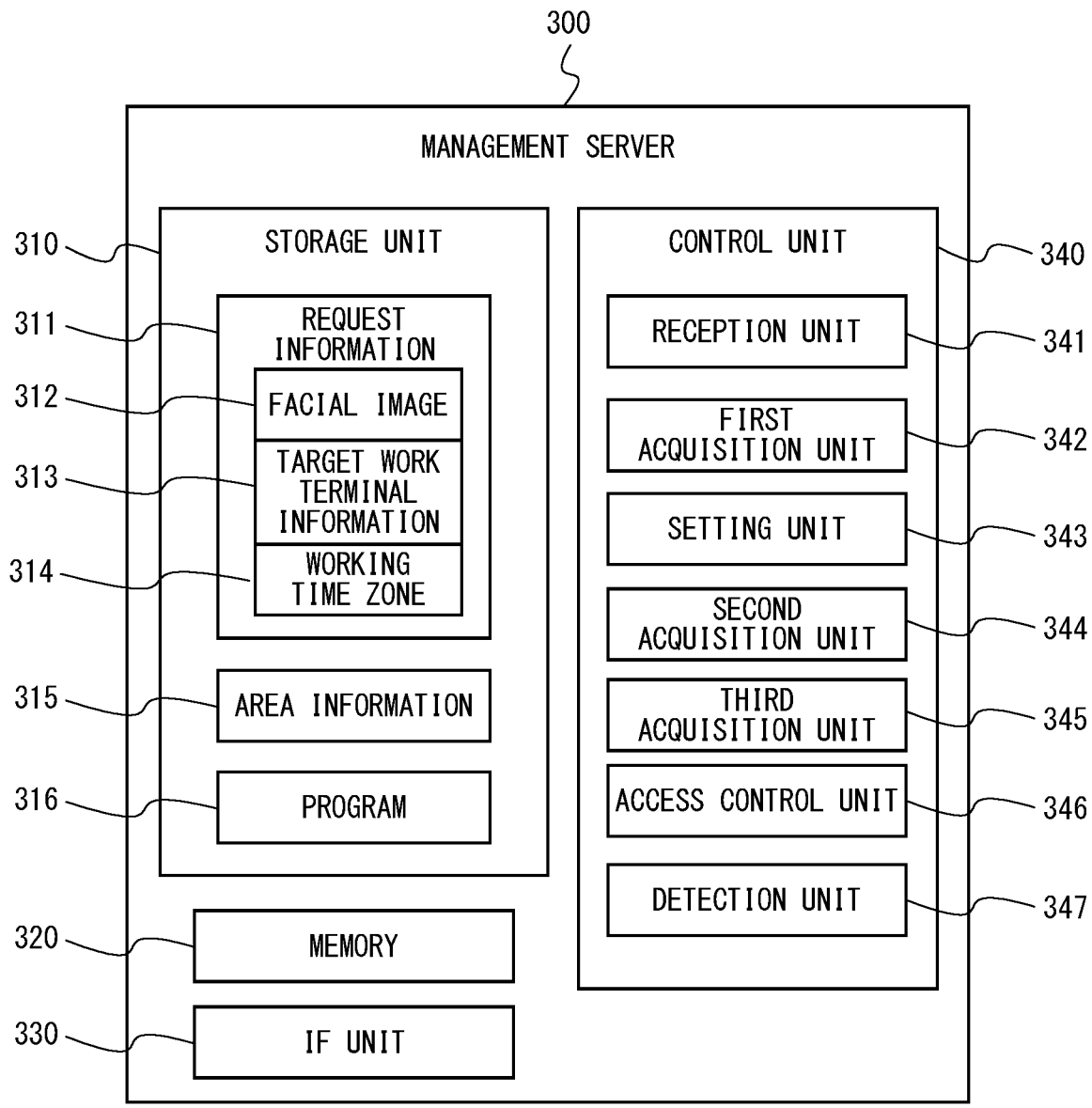
FIG. 4 is a block diagram showing a configuration of a management server according to the second example embodiment.

The management server 300 is a computer apparatus that is connected to the network N and is for managing access control in the access control system 2000. FIG. 4 is a block diagram showing a configuration of a management server according to the second example embodiment. The management server 300 includes a storage unit 310, a memory 320, an IF (Interface) unit 330, and a control unit 340.

The storage unit 310 is a storage device such as a hard disk drive and a flash memory. The storage unit 310 stores request information 311, area information 315, and a program 316. The request information 311 includes a facial image 312, target work terminal information 313, and a working time zone 314. Note that in the case where the authentication apparatus 22 is an IC card reader, the request information 311 further includes a user ID. The facial image 312 is image data including the face of a user for which a request is made. The facial image 312 may be image information including images of user's face viewed (e.g., photographed) in a plurality of directions in addition to the front image thereof. The target work terminal information 313 is information about a target terminal apparatus by which the user for which the request has been made does work (performs an operation). The target work terminal information 313 may be any information including at least a terminal ID or the like. The working time zone 314 is information indicating a time zone in which the user for which the request has been made does work.

The area information 315 is information about the definition of each area in the target work room 200. It is assumed that in the area information 315, for example, an area is defined by a set of coordinates by which the area is uniquely determined in the target work room 200. Further, it is assumed that in the area information 315, a work area for each terminal apparatus or a prohibited area for each terminal apparatus in the target work room 200 is defined.

Figure 5:
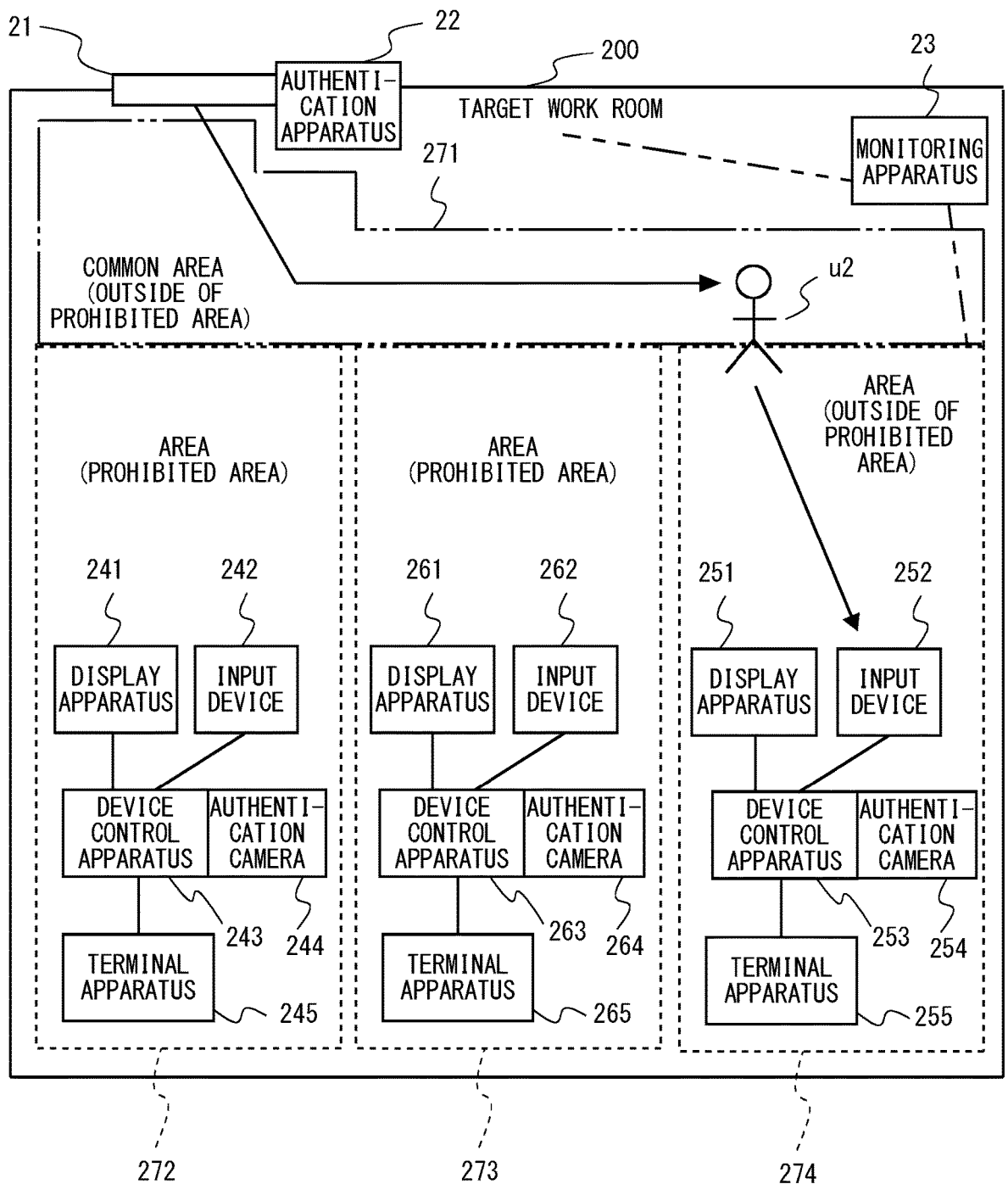
FIG. 5 is a diagram for explaining a concept of a work area according to the second example embodiment.

FIG. 5 is a diagram for explaining a concept of a work area according to the second example embodiment. In this example, it is shown that four areas, i.e., a common area 271 and areas 272 to 274 are defined in the target work room 200. Note that how to define areas (e.g., the arrangement of areas) is not limited to the above-described example.

The area 272 includes a display apparatus 241, an input device 242, a device control apparatus 243, an authentication camera 244, and a terminal apparatus 245, and is a part of a work area where a specific user who has made a request in advance is permitted to stay in order to operate the terminal apparatus 245. The area 273 includes a display apparatus 261, an input device 262, a device control apparatus 263, an authentication camera 264, and a terminal apparatus 265, and is a part of a work area where a specific user who has made a request in advance is permitted to stay in order to operate the terminal apparatus 265. Note that each of the components installed or provided in the area 273 has the same function as that of the corresponding component installed or provided in the area 24, and therefore the redundant description thereof is omitted. The area 274 includes a display apparatus 251, an input device 252, a device control apparatus 253, an authentication camera 254, and a terminal apparatus 255, and is a part of a work area where a specific user who has made a request in advance is permitted to stay in order to operate the terminal apparatus 255.

The common area 271 is an area where the user is permitted to pass through in order to reach any of the areas 272 to 274. Further, it is assumed that the user cannot operate the input devices 242, 252, 262 and the like from the common area 271, and cannot see what are displayed in the display apparatuses 241, 251 and 261 from the common area 271.

It is assumed that in the example shown in FIG. 5, the common area 271 and the area 272 are defined for the terminal apparatus 245 in the area information 315. Further, it is assumed that the common area 271 and the area 273 are defined for the terminal apparatus 265, and the common area 271 and the area 274 are defined for the terminal apparatus 255 in the area information 315. Further, it is assumed that the user u2 has already made a request for the terminal apparatus 255. Therefore, the common area 271 and the area 274 are set (i.e., defined) as the work area for the user u2.

Alternatively, the areas 273 and 274 may be defined as a prohibited area for the terminal apparatus 245 in the area information 315. Note that the prohibited area means an area where the use is prohibited from staying in the target work room. Further, the areas 272 and 274 may be defined as a prohibited area for the terminal apparatus 265, and the areas 272 and 273 may be defined as a prohibited area for the terminal apparatus 255. Even in this case, the common area 271 and the area 274, which are located outside the prohibited area for the terminal apparatus 255, are set (i.e., defined) as the work area for the user u2.

The description is continued by referring to FIG. 4 again. The program 316 is a computer program including instructions or the like for performing an access control process including a work area setting process, a device operation authentication process, and an unauthorized device detection process according to this example embodiment.

The memory 320 is a volatile storage device such as a RAM (Random Access Memory), and is a storage area in which information is temporarily held during the operation of the control unit 340. The IF unit 330 is an interface through which the management server 300 externally receive/output data. For example, the IF unit 330 outputs information received through the network N to the control unit 340. Further, the IF unit 330 transmits an instruction through the network N in response to an instruction from the control unit 340.

The control unit 340 is a processor, i.e., a control apparatus that controls each component in the management server 300. The control unit 340 loads the program 316 from the storage unit 310 into the memory 320, and executes the loaded program 316. In this way, the control unit 340 implements the functions of a reception unit 341, a first acquisition unit 342, a setting unit 343, a second acquisition unit 344, a third acquisition unit 345, an access control unit 346, and a detection unit 347.

The reception unit 341 receives request information for a target work terminal by a specific user from the administrator terminal 400 through the network N, and stores the received request information in the storage unit 310 as request information 311.

The first acquisition unit 342 is an example of the above-described first acquisition unit 110. Specifically, the first acquisition unit 342 acquires an authentication result from the authentication apparatus 22 through the network N. Note that the first acquisition unit 342 may request the authentication apparatus 22 to transmit the authentication result.

After the specific user is permitted to enter the target work room based on the authentication result, the setting unit 343 specifies a prohibited area based on the request information 311 and thereby sets (i.e., defines) a work area. Alternatively, the setting unit 343 may set an area that is defined based on the request information 311 as the work area.

The second acquisition unit 344 is an example of the above-described second acquisition unit 120. Specifically, the second acquisition unit 344 periodically receives a first photographed image (or a first filmed image) from the monitoring apparatus 23 through the network N, determines whether or not a user stays (has entered) in the predetermined prohibited area based on the photographed image, and acquires (i.e., uses) a result of the determination as a monitoring result.

The third acquisition unit 345 acquires, when access is made (i.e., attempted) from a first device for accessing the target work terminal, a second photographed image (or a second filmed image) obtained by photographing (or filming) the surroundings of the first device. For example, the third acquisition unit 345 acquires a photographed image (or a filmed image) obtained by the authentication camera 254 through the device control apparatus 253 and the network N.

The access control unit 346 is an example of the above-described access control unit 130. Specifically, the access control unit 346 determines whether or not the monitoring result indicates that the specific user stays in the work area after the specific user is permitted to enter the target work room based on the authentication result (i.e., determines whether or not a first condition is satisfied). In particular, the access control unit 346 determines whether or not the specific user stays in the work area by using the first photographed image. Further, the access control unit 346 permits access from the first device to the target work terminal when, in addition to the first condition, a second condition that a user shown in the second photographed image is the specific user is satisfied. Note that the first device is a device that is connected to the target work terminal through the device control apparatus that controls access to the target work terminal for each user. In the case of the area 25, the first device is the display apparatus 251 and the input device 252 connected to the terminal apparatus 255 through the device control apparatus 253.

When the detection unit 347 detects a second device connected to the target work terminal without the device control apparatus interposed therebetween, it determines whether or not the first condition is satisfied and outputs information indicating that the second device is connected together with the result of the determination. Note that the second device is an unauthorized keyboard, an unauthorized USB (Universal Serial Bus) memory, or the like that is brought in by the user who has entered the target work room 200. The detection unit 347 monitors a system log of the device control apparatus through the network N and detects an event log indicating that a new device is connected. In this case, the detection unit 347 performs the above-described determination using the first condition by the access control unit 346, and outputs information indicating that "a second device is connected" together with the determination result to an external display apparatus or the like (not shown). Note that the detection unit 347 may determine whether or not the second device is a device for which a request has been made in advance, and output information indicating that the second device is connected together with the determination result.

Figure 6:
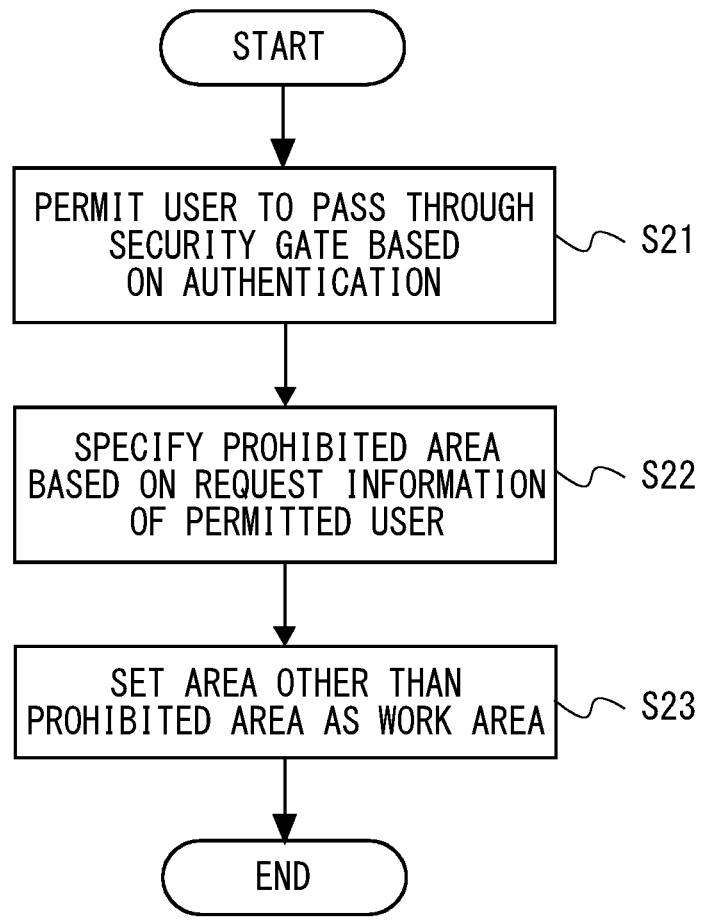
FIG. 6 is a flowchart showing a flow of a work-area setting process that is performed when a user passes through a security gate according to the second example embodiment.

FIG. 6 is a flowchart showing a flow of a work area setting process that is performed when a user passes through a security gate according to the second example embodiment. Firstly, it is assumed that a user u2 stood in front of the authentication apparatus 22 and has already been authenticated. In the case where the authentication apparatus 22 is a camera, the authentication apparatus 22 takes an image including the face of the user u2. Then, the authentication apparatus 22 acquires a facial image 312 from the management server 300 through the network N, and determines whether or not the degree of matching between the photographed image (or the filmed image) and the facial image 312 satisfies (e.g., is larger than) a predetermined degree. In this example, it is assumed that the degree of matching satisfies the predetermined degree. Therefore, the authentication apparatus 22 authenticates and permits the user u2 to pass through the security gate 21 (S21). As a result, the security gate 21 is opened and the user u2 enters the target work room 200.

At this point, the authentication apparatus 22 transmits the result of the authentication of the user u2 to the management server 300 through the network N. Therefore, the setting unit 343 of the management server 300 specifies a prohibited area based on the request information 311 of the user u2, who has been permitted to enter the room (S22). Specifically, the setting unit 343 specifies the prohibited area based on the target work terminal information 313 and the area information 315 in the request information 311. For example, when the target work terminal information 313 is information for the terminal apparatus 255, the areas 272 and 273 are specified as the prohibited area in the example shown in FIG. 5. Therefore, the setting unit 343 sets (i.e., defines) the areas outside the prohibited area as a work area (S23). In this example, the common area 271 and the area 274 are set as the work area. Note that a prohibited area may be set (i.e., defined) for each of the areas 272 to 274 in advance. Then, in the step S23, the prohibited area for the area 274 may be canceled.

Alternatively, in the steps S22 and S23, the setting unit 343 may specify a workable area based on the request information 311 of the user u2, who has been permitted to enter the room, and set the specified workable area as the work area. For example, when the target work terminal information 313 is information for the terminal apparatus 255, the common area 271 and the area 274 may be specified as workable areas and thereby set as the work area in the example shown in FIG. 5.

Figure 7:
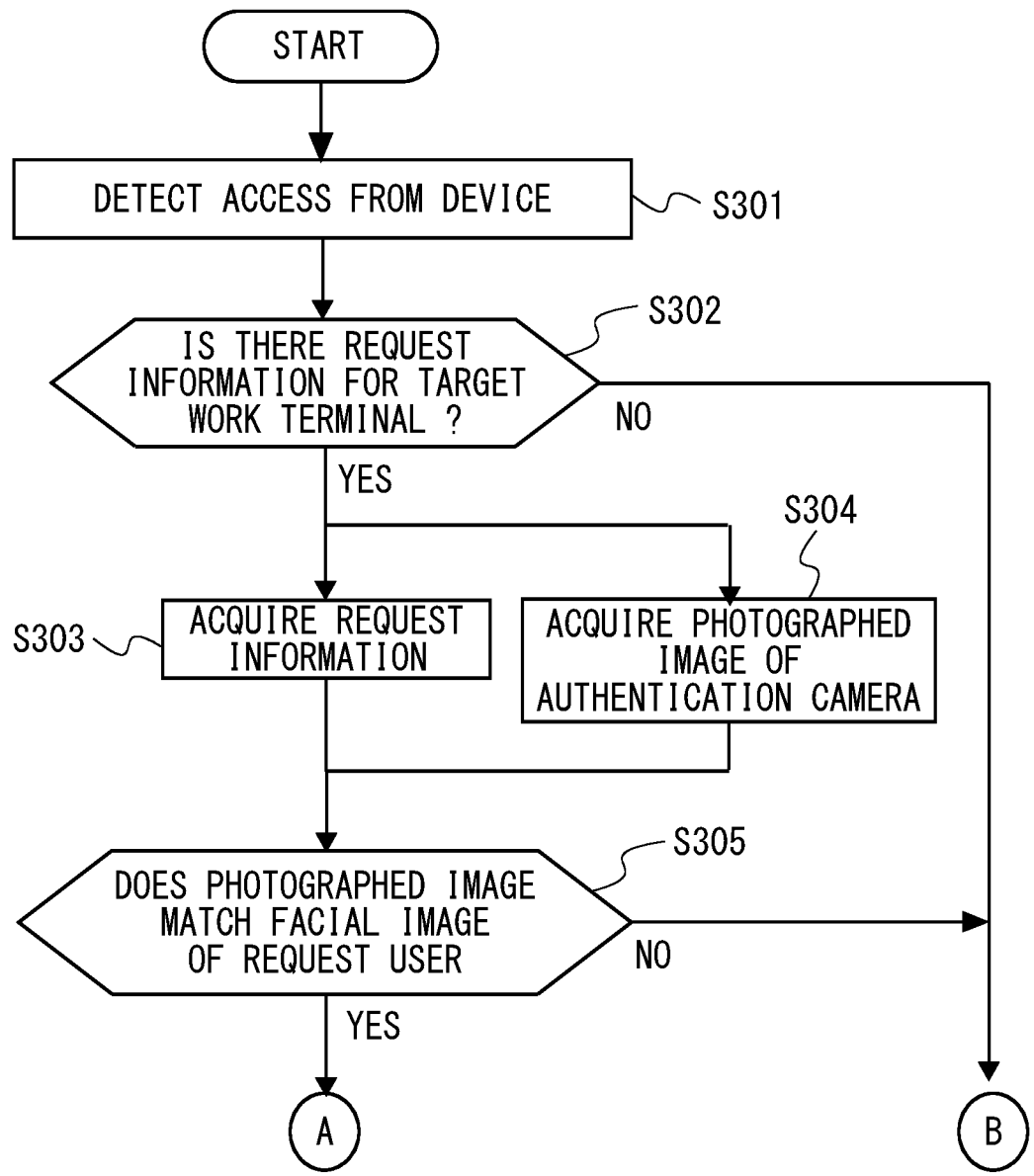
FIG. 7 is a flowchart showing a flow of a device operation authentication process according to the second example embodiment.
Figure 8:
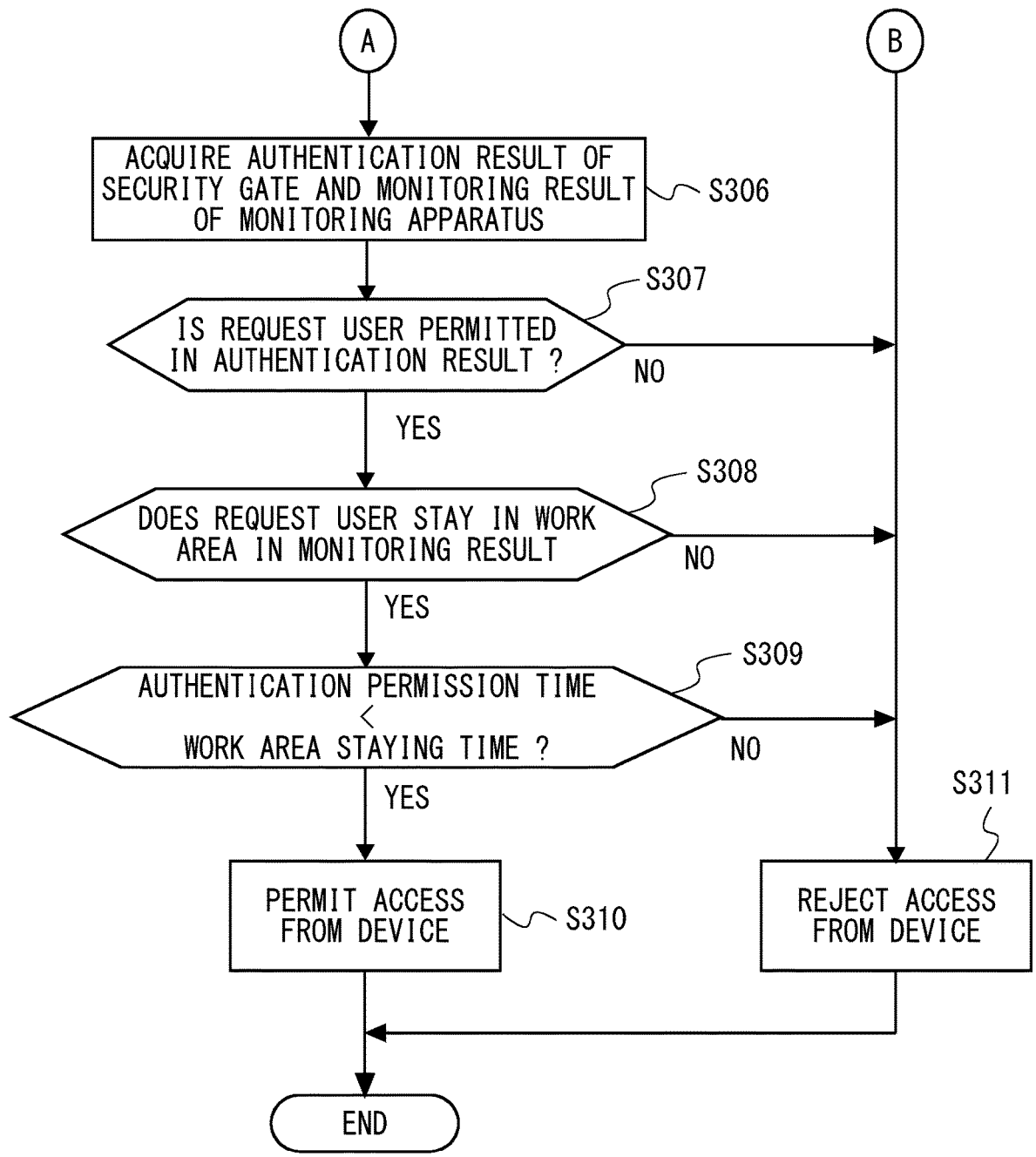
FIG. 8 is a flowchart showing a flow of a device operation authentication process according to the second example embodiment.

FIGS. 7 and 8 show a flowchart showing a flow of a device operation authentication process according to the second example embodiment. In this example, it is assumed that after the processes shown in FIG. 6, the user u2 has passed through the common area 271, entered the area 274, and arrives at a place in front of the display apparatus 251 and the input device 242. Further, it is assumed that the user u2 has operated the input device 252.

At this point, the device control apparatus 253 detects a signal for accessing the terminal apparatus 255 from the input device 252. That is, the device control apparatus 253 detects access from the device (S301). At this point, the device control apparatus 253 sends a notification indicating that it has detected the access from the device to the management server 300 through the network N. Therefore, it can be considered that the access control unit 346 of the management server 300 detects access from the device.

Next, the access control unit 346 determines whether or not there is request information 311 for the target work terminal (S302). For example, the access control unit 346 refers to the target work terminal information 313 included in the request information 311 stored in the storage unit 310 and thereby determines whether or not a request for the terminal apparatus 255 (to which the device control apparatus 253 is connected) has already been made.

When there is request information 311 for the target work terminal, the access control unit 346 reads, i.e., acquires the request information 311 from the storage unit 310 (S303). Further, the access control unit 346 acquires a photographed image (or a filmed image) from the authentication camera 254 (S304). That is, the authentication camera 254 takes an image including the user u2 staying in front of the display apparatus 251 and the input device 252, and outputs the photographed image (or the filmed image) to the device control apparatus 253. Then, the device control apparatus 253 transmits the photographed image (or the filmed image) to the management server 300 through the network N. In this way, the access control unit 346 acquires the photographed image (or the filmed image).

Then, the access control unit 346 determines whether or not the photographed image (or the filmed image) matches the facial image of the user who has made the request (hereinafter also referred to as the request user) (S305). That is, the access control unit 346 determines whether or not the facial image 312 included in the request information 311 acquired in the step S303 matches the facial image acquired in the step S304 (whether or not the degree of matching is in a predetermined range). Note that in this example, it is assumed that the request user is the user u2.

When it is determined that the facial images match each other in the step S305, the first acquisition unit 342 acquires the result of the authentication that was performed by the authentication apparatus 22 at the security gate 21, and the second acquisition unit 344 acquires the monitoring result of the monitoring apparatus 23 (S306). Note that when the management server 300 has acquired the authentication result or the monitoring result in advance, it may use it.

Next, the access control unit 346 determines whether or not the request user has been permitted to enter the room based on the recognition result (S307). When it is determined that the request user has been permitted to enter the room based on the recognition result, the access control unit 346 determines whether or not the monitoring result indicates that the request user stays in the work area (S308).

For example, the access control unit 346 specifies the facial area of the person included in the first photographed image, which is the monitoring result, and determines whether or not the degree of matching between the specified facial area and the facial image 312 satisfies a predetermined condition. When the degree of matching satisfies the predetermined condition, the person of which the facial area has been specified can be considered to be the request user (the user u2 in this example). Further, the access control unit 346 specifies the position of the person included in the first photographed image in the target work room 200, and specifies an area that includes the specified position. Then, when the specified area is included in the work area where the request user has been permitted to stay, the access control unit 346 determines that the specific user stays in the work area. For example, when the position of the user u2 is in the area 274, the access control unit 346 determines that the user u2 stays in the area 274, which is the work area.

When it is determined that the request user stays in the work area in the step S308, the access control unit 346 determines whether or not the time of the authentication permission in the authentication result is earlier than the time of the stay in the work area (S309). That is, it can be considered that the access control unit 346 determines whether or not the first condition is satisfied through the determinations in the steps S307 to S309.

When it is determined that the time of the authentication permission is earlier than the time of the stay, the access control unit 346 permits access from the device (which was detected in the step S301) (S310). Specifically, the access control unit 346 transmits an access control instruction indicating that access is permitted to the device control apparatus 253 through the network N. Then, the device control apparatus 253 outputs an operation signal sent from the input device 252 to the terminal apparatus 255 and outputs an output signal (a signal indicating an image to be displayed) sent from the terminal apparatus 255 to the display apparatus 251 according to the access control instruction received from the management server 300 through the network N.

On the other hand, when it is determined to be NO in any of the steps S302, S305, S307, S308 and S309, the access control unit 346 rejects the access from the device (which was detected in the step S301) (S311). Specifically, the access control unit 346 transmits an access control instruction indicating that the access is rejected to the device control apparatus 253 through the network N. Then, the device control apparatus 253 discards the operation signal sent from the input device 300 according to the access control instruction received from the management server 252 through the network N. The device control apparatus 253 refrains from outputting, at least, the operation signal sent from the input device 252 to the terminal apparatus 255.

For example, when it is determined to be NO in the step S302, it corresponds to a situation where a user who has entered the room in some way has attempted to operate a terminal for which no request has been made, but the attempt of the operation has been detected and hence the access is prevented. Further, when it is determined to be NO in the step S305, it corresponds to a situation where a user who has entered the room in some way has attempted to operate a terminal of which the request user has left the work area, but the attempt of the operation has been detected and hence the access is prevented. Further, when it is determined to be NO in the step S307, it corresponds to a situation where a user who has illegally entered the room has been detected and hence the access is prevented. Further, when it is determined to be NO in the step S308, it corresponds to a situation where a user other than the request user has entered the work area and attempted to operate a terminal, but the attempt of the operation has been detected and hence the access is prevented. For example, a situation where a user other than the request user has entered the room together with the request user corresponds to the above-described situation. Further, when it is determined to be NO in the step S309, it corresponds to a situation where the request user has (intentionally or unintentionally) attempted to operate the terminal through some illegal action or behavior, but the attempt of the operation has been detected and hence the access is prevented.

Figure 9:
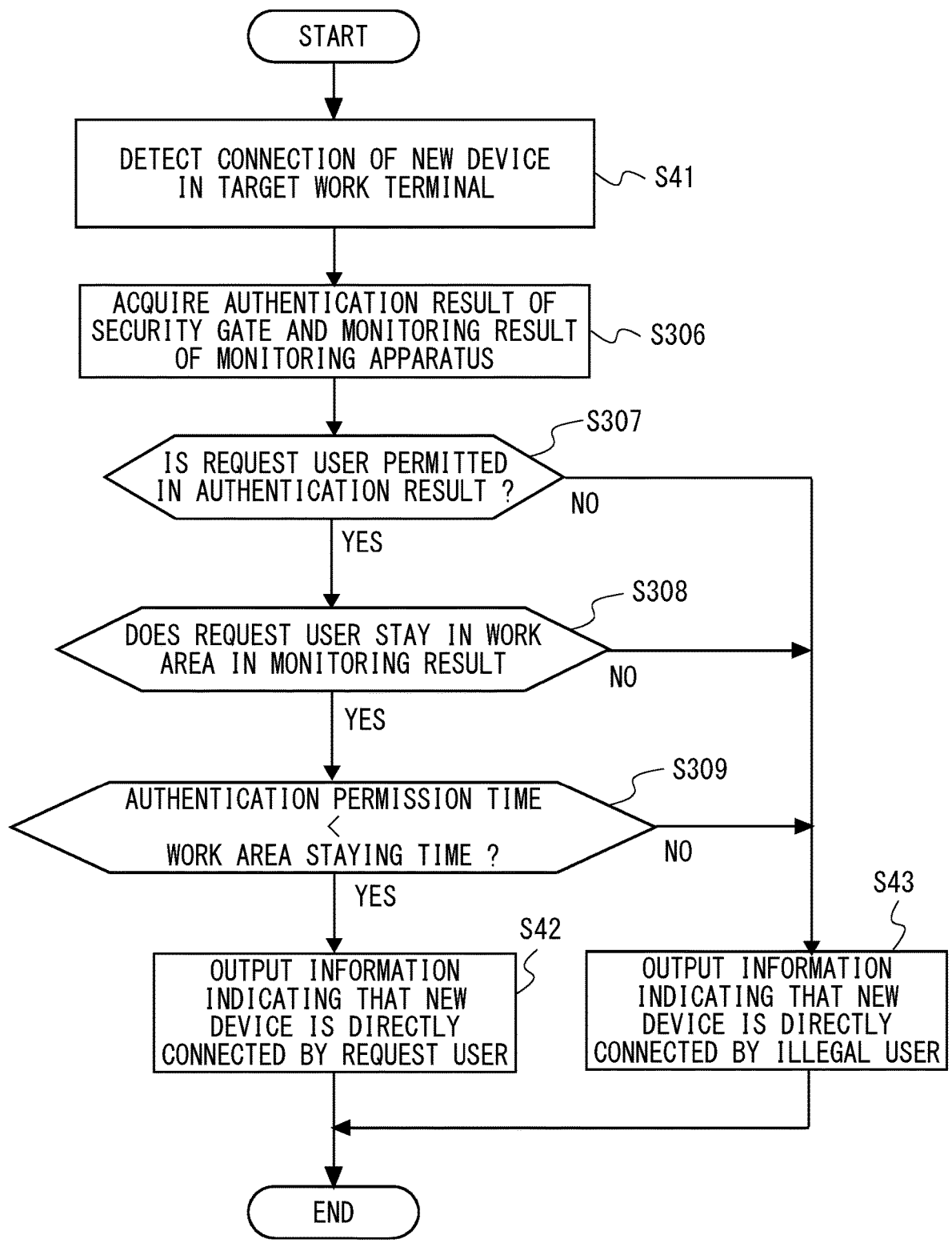
FIG. 9 is a flowchart showing a flow of an unauthorized device detection process according to the second example embodiment.

FIG. 9 is a flowchart showing a flow of an unauthorized device detection process according to the second example embodiment. In this example, it is assumed that, for example, a user (e.g., the user u2) who has somehow managed to enter the target work room 200 directly connects a device that has been brought in by the user himself/herself to the terminal apparatus 255 without the device control apparatus 253 interposed therebetween. In this case, the terminal apparatus 255 outputs information about the connected device to the system log. Meanwhile, the detection unit 347 of the management server 300 is monitoring the system log of the terminal apparatus 255 through the network N. Therefore, the detection unit 347 detects the connection of the new device in the target work terminal (the terminal apparatus 255 in this example) (S41).

Then, the detection unit 347 performs the processes in the steps S306 to S309 in FIG. 8. Alternatively, the detection unit 347 may acquire results of the processes in the steps S306 to S309 (i.e., the determination result) from the access control unit 346.

When it is determined that the time of the authentication permission is earlier than the time of the stay in the step S309, the detection unit 347 outputs information indicating that a new device is directly connected by the request user (S42). For example, there is a possibility that the request user has mistakenly connected the new device directly to the terminal apparatus 255 without having any dishonest intention. However, for example, when the new device is a USB memory, there is a risk that the terminal apparatus may be infected with a virus. Therefore, it is beneficial to detect a connection that is carelessly or unintentionally made by the request user.

On the other hand, when it is determined to be NO in any of the steps S307, S308 and S309, the detection unit 347 outputs information indicating that a new device is directly connected by an unauthorized user (S43). For example, when a user who has already made a request for a terminal apparatus directly connects a new device to another terminal apparatus for which the user has made no request, access control by the device control apparatus 243 is not appropriately performed. In particular, if the new device is a keyboard or the like, there is a risk that the terminal apparatus may be illegally operated. Even in such a case, the illegal operation can be quickly detected and hence the administrator can recognize and cope with the illegal operation.

Third Example Embodiment

A third example embodiment is a modified example of the above-described second example embodiment. In the third example embodiment, a device control apparatus performs access control by making determinations using a first condition and a second condition. An access control system according to the third example embodiment is substantially the same as that shown in FIG. 3, except that the device control apparatuses 243 and 253 and the management server 300 are replaced by device control apparatuses 243a and 253a and a management server 300a, respectively, according to the third example embodiment. Therefore, illustrations of the same or corresponding components in the drawings are omitted as appropriate.

In this case, the management server 300a may not include the third acquisition unit 345. Further, for example, the access control unit 346 of the management server 300a may determine whether or not the monitoring result indicates that the user stays in the work area, and transmit the result of the determination to the device control apparatus. Alternatively, the management server 300a may transmit the first photographed image, which is the monitoring result, together with the area information 315 to the device control apparatus through the network N without determining whether or not the monitoring result indicates the user stays in the work area by itself. Further, in response to a request from the device control apparatus, the management server 300a transmits the request information 311, the authentication result, and the monitoring result to the device control apparatus, which has made the request, through the network N.

Figure 10:
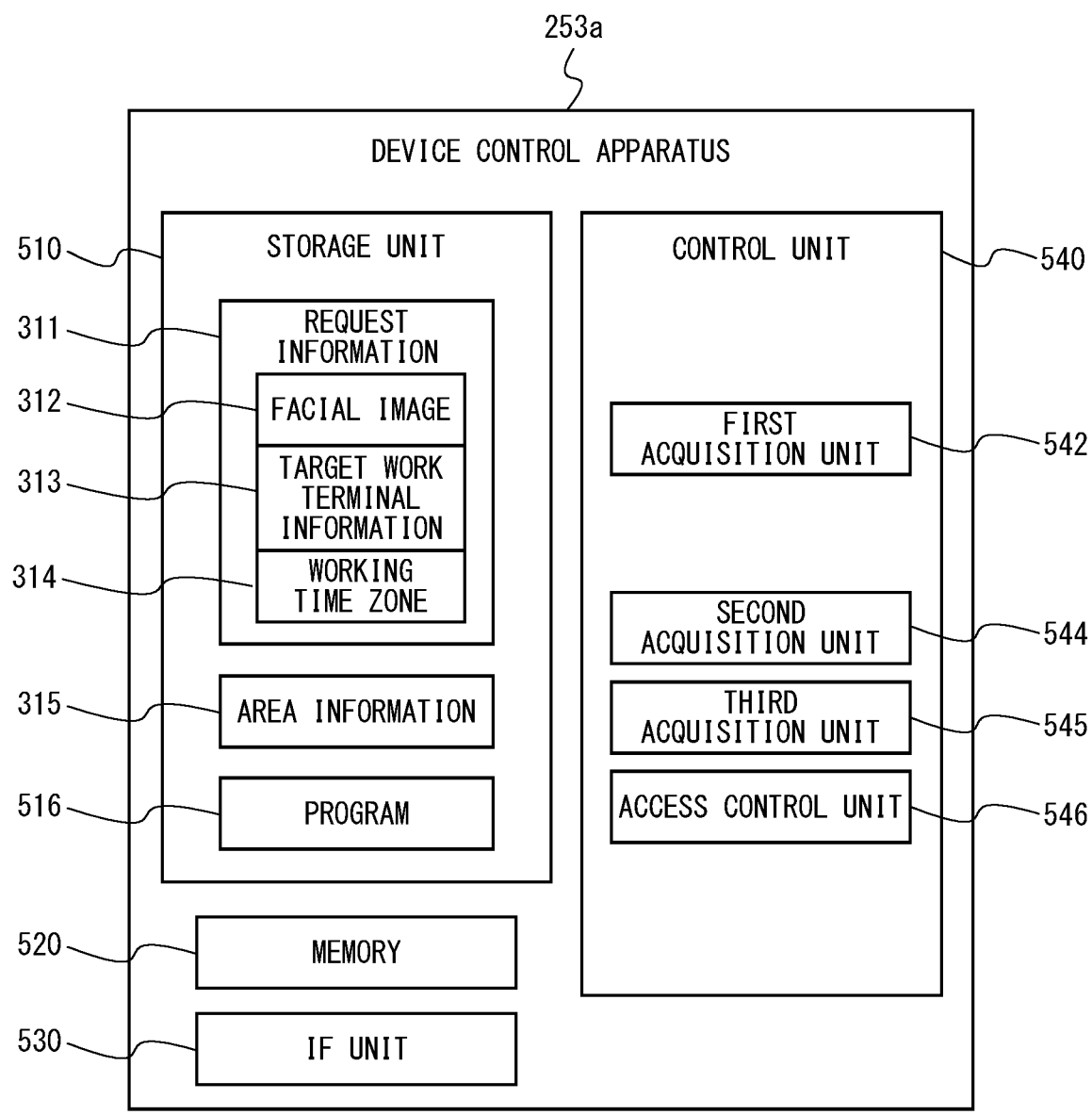
FIG. 10 is a block diagram showing a configuration of a device control apparatus according to a third example embodiment.

FIG. 10 is a block diagram showing a configuration of a device control apparatus 253a according to the third example embodiment. Note that the device control apparatus 243a has a similar configuration. The device control apparatus 253a is an example of the information processing apparatus 100, and relays the connection between the terminal apparatus 255, which is the target work terminal, and the display apparatus 251, which are the first device, and the connection between the terminal apparatus 255 and the input device 252, which are also the first device. The device control apparatus 253a includes a storage unit 510, a memory 520, an IF unit 530, and a control unit 540. The storage unit 510 stores request information 311, area information 315, and a program 516. As described above, the request information 311 and the area information 315 are acquired from the management server 300 through the network N and stored into the storage unit 510. In particular, the target work terminal information 313 included in the request information 311 is information about the terminal apparatus 255. In the area information 315, an area 25 (a common area 271 and an area 274) is set (i.e., defined) as a work area. The program 516 is a computer program including instructions or the like for performing an access control process including a device operation authentication process according to the third example embodiment.

The memory 520 is similar to the memory 320. However, the memory 520 may store the request information 311 and the area information 315 on behalf of the storage unit 510.

The IF unit 530 controls and relays signals between the display apparatus 251 and the terminal apparatus 255, and between the input device 252 and the terminal apparatus 255 according to the access control information (not shown). Further, the IF unit 530 also performs processes substantially the same as those performed by the IF unit 330.

The control unit 540 loads the program 516 from the storage unit 510 into the memory 520, and executes the loaded program 516. In this way, the control unit 540 implements the functions of a first acquisition unit 542, a second acquisition unit 544, a third acquisition unit 545, and an access control unit 546.

The first acquisition unit 542 is an example of the above-described first acquisition unit 110. Specifically, the first acquisition unit 542 requests the management server 300a to transmit the authentication result through the network N, and acquires the authentication result transmitted from the management server 300a. Note that the first acquisition unit 542 requests the management server 300a to transmit the request information 311 and the area information 315 through the network N, and acquires the request information 311 and the area information 315 transmitted from the management server 300a.

The second acquisition unit 544 is an example of the above-described second acquisition unit 120. Specifically, the second acquisition unit 544 receives a first photographed image (at least the latest first photographed image) from the management server 300a through the network N, determines whether or not the user stays (has entered) in the predetermined prohibited area in the photographed image, and acquires the determination result as the monitoring result. Alternatively, the second acquisition unit 544 may acquire the determination result obtained by the management server 300a as the monitoring result.

The third acquisition unit 545 acquires, when access is made (i.e., attempted) from the input device 252, a second photographed image (or a second filmed image) obtained by photographing (or filming) the surroundings the input device 252 by the authentication camera 254.

The access control unit 546 is an example of the above-described access control unit 130. Specifically, the access control unit 546 may determine whether or not the monitoring result indicates that the specific user stays in the work area after the specific user is permitted to enter the target work room based on the authentication result (i.e., determines whether or not the first condition is satisfied). In particular, the access control unit 546 may determine whether or not the specific user stays in the work area by using the first photographed image. Further, the access control unit 546 permits access from the first device to the target work terminal when, in addition to the first condition, a second condition that a user shown in the second photographed image is the specific user is satisfied.

Further, the device control apparatus 253a may include a component corresponding to the setting unit 343 of the second example embodiment.

Further, the device control apparatus 253a performs a process corresponding to the above-described device operation authentication process shown in FIGS. 7 and 8. However, they are different in the following points.

Firstly, although the device control apparatus 253a detects a signal for accessing the terminal apparatus 255 from the input device 252 in the step S301, it may omit notifying the management server 300 of the detection of the signal.

Next, in the step S302, the access control unit 546 of the device control apparatus 253a inquires, through the network N, the management server 300a about the presence or absence of request information 311 for the terminal apparatus 255. Further, when there is request information 311 for the terminal apparatus 255, the access control unit 546 acquires the request information 311 for the terminal apparatus 255 from the management server 300a through the network N (S303) and stores the acquired request information 311 into the storage unit 510 or the memory 520.

Further, although the access control unit 546 acquires a photographed image (or a filmed image) from the authentication camera 254 in the step S304, it may omit transmitting the photographed image (or the filmed image) to the management server 300a.

Next, in the step S305, the access control unit 546 determines whether or not the photographed image matches the facial image of the request user in the device control apparatus 253a.

Further, in the step S306, the first acquisition unit 542 acquires the authentication result from the management server 300a through the network N, and the second acquisition unit 544 acquires the monitoring result from the management server 300a through the network N.

Next, the access control unit 546 determines whether or not the request user has been permitted to enter the room in the acquired recognition result (S307). When it is determined that the request user has been permitted to the room in the recognition result, the access control unit 546 determines whether or not the monitoring result indicates that the request user stays in the work area (S308). At this point, the access control unit 546 may perform substantially the same determination process as that performed by the access control unit 346. Alternatively, when the monitoring result is the determination result (i.e., when the determination is made on the management server 300a side), the access control unit 546 can use the monitoring result itself as the determination result in the step S308.

When it is determined that the request user stays in the work area in the step S308, the access control unit 546 determines whether or not the time of the authentication permission in the authentication result is earlier than the time of the stay in the work area (S309). That is, it can be considered that the access control unit 546 determines whether or not the first condition is satisfied by the determinations in the steps S307 to S309.

When it is determined that the time of the authentication permission is earlier than the time of the stay, the access control unit 546 permits access from the device (which was detected in the step S301) (S310). Specifically, the access control unit 546 outputs an operation signal sent from the input device 252 to the terminal apparatus 255, and outputs an output signal (a signal indicating an image to be displayed) sent from the terminal apparatus 255 to the display apparatus 251.

On the other hand, when it is determined to be NO in any of the steps S302, S305, S307, S308 and S309, the access control unit 546 rejects the access from the device (which was detected in the step S301) (S311). Specifically, the access control unit 546 discards the operation signal sent from the input device 252. The device control apparatus 253a refrains from outputting, at least, the operation signal sent from the input device 252 to the terminal apparatus 255.

As described above, the device control apparatus according to the third example embodiment can also perform the access control process.

Other Example Embodiment

Note that the present disclosure is described as a hardware configuration in the above-described example embodiments, the present disclosure is not limited to the hardware configurations. In the present disclosure, an arbitrary process can also be implemented by causing a CPU to execute a computer program.

In the above-described examples, the program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, DVD (Digital Versatile Disc) and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Note that the invention is not limited to the above-described example embodiments and various changes may be made therein without departing from the spirit and scope of the present invention. Further, the present disclosure may be implemented by combining example embodiments with one another.

The whole or part of the embodiments disclosed above can be described as, but not limited to, the following supplementary notes.

(Supplementary Note 1)
An information processing apparatus comprising:
a first acquisition unit configured to acquire a result of authentication performed when a specific user enters a target work room;
a second acquisition unit configured to acquire a monitoring result obtained by periodically monitoring a staying state of the specific user in a work area including a target work terminal in the target work room; and
an access control unit configured to permit access to the target work terminal when a first condition is satisfied, the first condition being a condition that the monitoring result indicates that the specific user stays in the work area after he/she is permitted to enter the target work room based on the authentication result.

(Supplementary Note 2)
The information processing apparatus described in Supplementary note 1, wherein
the second acquisition unit acquires, as the monitoring result, a first photographed image taken by a camera configured to shoot the inside of the target work room, and
the access control unit determines whether or not the specific user stays in the work area by using the first photographed image.

(Supplementary Note 3)
The information processing apparatus described in Supplementary note 1 or 2, wherein the work area is an area other than a prohibited area where the specific user is prohibited from staying in the target work room.

(Supplementary Note 4)
The information processing apparatus described in Supplementary note 3, further comprising:
a reception unit configured to receive request information for a target work terminal by the specific user; and
a setting unit configured to specify the prohibited area based on the request information and thereby set the work area after the specific user is permitted to enter the target work room based on the authentication result.

(Supplementary Note 5)
The information processing apparatus described in any one of Supplementary notes 1 to 4, further comprising a third acquisition unit configured to acquire, when access is made from a first device for accessing the target work terminal, a second photographed image obtained by shooting surroundings of the first device, wherein
the access control unit permits access from the first device to the target work terminal when, in addition to the first condition, a second condition is satisfied, the second condition being a condition that a user shown in the second photographed image is the specific user.

(Supplementary Note 6)
The information processing apparatus described in Supplementary note 5, wherein the first device is a device connected to the target work terminal through a device control apparatus, the device control apparatus being configured to control, for each user, access to the target work terminal.

(Supplementary Note 7)
The information processing apparatus described in Supplementary note 6, further comprising a detection unit configured to determine, when detecting a second device connected to the target work terminal without the device control apparatus interposed therebetween, whether or not the first condition is satisfied and outputs information indicating that the second device is connected together with the determination result.

(Supplementary Note 8)
The information processing apparatus described in Supplementary note 5, wherein the information processing apparatus is a device control apparatus configured to relay a connection between the target work terminal and the first device.

(Supplementary note 9)
An access control method comprising:
acquiring, by a computer, a result of authentication performed when a specific user enters a target work room;
acquiring, by the computer, a monitoring result obtained by periodically monitoring a staying state of the specific user in a work area including a target work terminal in the target work room; and
permitting, by the computer, access to the target work terminal when a first condition is satisfied, the first condition being a condition that the monitoring result indicates that the specific user stays in the work area after he/she is permitted to enter the target work room based on the authentication result.

(Supplementary Note 10)
An access control program for causing a computer to perform:
a first acquisition process of acquiring a result of authentication performed when a specific user enters a target work room;
a second acquisition process of acquiring a monitoring result obtained by periodically monitoring a staying state of the specific user in a work area including a target work terminal in the target work room; and an access control process of permitting access to the target work terminal when a first condition is satisfied, the first condition being a condition that the monitoring result indicates that the specific user stays in the work area after he/she is permitted to enter the target work room based on the authentication result.

Although the present disclosure has been described above with reference to the example embodiment (and examples), the present disclosure is not limited to the above-described example embodiment (and examples). Various modifications that can be understood by those skilled in the art can be made to the configuration and details of the present disclosure within the scope of the present disclosure.

The present disclosure provides an information processing apparatus, an access control method, and an access control program for realizing flexible access control for a plurality of terminal apparatuses in a physically-secured area.

The first, second and third embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. An information processing apparatus comprising:
at least one memory storing instructions and
at least one processor configured to execute the instructions to:
acquire a result of authentication performed when a specific user enters a target work room which is installed with a plurality of target work terminals, the specific user is permitted to stay in a predetermined work area in order to operate a predetermined target work terminal among the plurality of target work terminals, the predetermined work area being a part area of the target work room;
acquire a monitoring result obtained by periodically monitoring a staying state of the specific user in the predetermined work area; and
permit access to the predetermined target work terminal when a first condition is satisfied, the first condition being a condition that the monitoring result indicates that the specific user stays in the predetermined work area after he/she is permitted to enter the target work room based on the authentication result.

2. The information processing apparatus according to claim 1, wherein the at least one processor further configured to execute the instructions to
acquire, as the monitoring result, a first photographed image taken by a camera configured to shoot the inside of the target work room, and
determine whether or not the specific user stays in the predetermined work area by using the first photographed image.

3. The information processing apparatus according to claim 1, wherein the predetermined work area is an area other than a prohibited area where the specific user is prohibited from staying in the target work room.

4. The information processing apparatus according to claim 3, wherein the at least one processor further configured to execute the instructions to
receive request information for a target work terminal by the specific user; and
specify the prohibited area based on the request information and thereby set the predetermined work area after the specific user is permitted to enter the target work room based on the authentication result.

5. The information processing apparatus according to claim 1, wherein the at least one processor further configured to execute the instructions to acquire, when access is made from a first device for accessing the predetermined target work terminal, a second photographed image obtained by shooting surroundings of the first device, and
permit access from the first device to the predetermined target work terminal when, in addition to the first condition, a second condition is satisfied, the second condition being a condition that a user shown in the second photographed image is the specific user.

6. The information processing apparatus according to claim 5, wherein the first device is a device connected to the predetermined target work terminal through a device control apparatus, the device control apparatus being configured to control, for each user, access to the predetermined target work terminal.

7. The information processing apparatus according to claim 6, wherein the at least one processor further configured to execute the instructions to
determine, when detecting a second device connected to the predetermined target work terminal without the device control apparatus interposed therebetween, whether or not the first condition is satisfied and output information indicating that the second device is connected together with the determination result.

8. The information processing apparatus according to claim 5, wherein the information processing apparatus is a device control apparatus configured to relay a connection between the predetermined target work terminal and the first device.

9. An access control method comprising:
acquiring, by a computer, a result of authentication performed when a specific user enters a target work room which is installed with a plurality of target work terminals, the specific user is permitted to stay in a predetermined work area in order to operate a predetermined target work terminal among the plurality of target work terminals, the predetermined work area being a part area of the target work room;
acquiring, by the computer, a monitoring result obtained by periodically monitoring a staying state of the specific user in the predetermined work area; and
permitting, by the computer, access to the predetermined target work terminal when a first condition is satisfied, the first condition being a condition that the monitoring result indicates that the specific user stays in the predetermined work area after he/she is permitted to enter the target work room based on the authentication result.

10. A non-transitory computer readable medium storing an access control program for causing a computer to perform:
a first acquisition process of acquiring a result of authentication performed when a specific user enters a target work room which is installed with a plurality of target work terminals, the specific user is permitted to stay in a predetermined work area in order to operate a predetermined target work terminal among the plurality of target work terminals, the predetermined work area being a part area of the target work room;

a second acquisition process of acquiring a monitoring result obtained by periodically monitoring a staying state of the specific user in the predetermined work area; and an access control process of permitting access to the predetermined target work terminal when a first condition is satisfied, the first condition being a condition that the monitoring result indicates that the specific user stays in the predetermined work area after he/she is permitted to enter the target work room based on the authentication result.

* * * * *